US011113090B1

(12) United States Patent
Wilkinson et al.

(10) Patent No.: US 11,113,090 B1
(45) Date of Patent: Sep. 7, 2021

(54) SYSTEMS AND METHODS FOR CONTAINER MANAGEMENT

(71) Applicant: UIPCO, LLC, San Antonio, TX (US)

(72) Inventors: Christopher T. Wilkinson, San Antonio, TX (US); Neelsen Edward Cyrus, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 231 days.

(21) Appl. No.: 16/050,684

(22) Filed: Jul. 31, 2018

Related U.S. Application Data (60) Provisional application No. 62/543,255, filed on Aug. 9, 2017.

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01); *G06F 2009/45575* (2013.01); *G06F 2009/45587* (2013.01)

(58) Field of Classification Search
CPC .............. G06F 9/45558; G06F 9/5077; G06F 2009/4557; G06F 2009/45575; G06F 2009/45587

USPC ........................................................... 718/1
See application file for complete search history.

(56) References Cited

U.S. PATENT DOCUMENTS

| | | | | |
|---|---|---|---|---|
| 8,819,673 | B1* | 8/2014 | Wilkinson | G06F 9/45558 718/1 |
| 2002/0147611 | A1* | 10/2002 | Greene | G06Q 10/063112 705/1.1 |
| 2018/0246729 | A1* | 8/2018 | Kumar | G06F 9/445 |
| 2019/0042321 | A1* | 2/2019 | Venkatesh | G06F 9/5061 |

* cited by examiner

*Primary Examiner* — Bradley A Teets
(74) *Attorney, Agent, or Firm* — Perkins Coie LLP (57) ABSTRACT

A container management utility tool may deploy an object model that may persist one or more container dependencies, relationships, or a collection of containers that may represent a system function. Through a web front-end interface, for example, the containers may be started, stopped, or restarted in a specific order, and the tool automatically determines the additional containers that need to be started in order to maintain the integrity of the environment. Through the web interface, for example, the object model may be managed, and start-up orders, container dependencies, or collection maps of containers that represent a system function may be updated. For containers that may not start under load, the object model may block access to the containers until the containers are fully initialized.

20 Claims, 8 Drawing Sheets

SYSTEMS AND METHODS FOR CONTAINER MANAGEMENT

CROSS-REFERENCE TO RELATED APPLICATIONS

This application claims priority to U.S. Provisional Patent Application Ser. No. 62/543,255, filed on Aug. 9, 2017, which is hereby incorporated by reference in its entirety.

TECHNICAL FIELD

This application relates generally to the field of computer based network resource management, and more specifically computer based systems and methods for container management on a network server.

BACKGROUND

Typically, containers such as Linux Containers (also known as LXCs) or Docker containers tend to be self-contained and tend to be independent of other containers such that they not rely on other containers. However, as web server farms continue to grow, dependencies may appear among the containers within an enterprise. For example, a first container may hold a data to be rendered and a second container may hold a rendering application that renders the data. In this example, the first container has to pass the data along to the second container and the rendering application in the second container renders the data from the first container. Because of such dependencies, specific container start orders must be adhered to or problems, such as outages, may occur. Additionally, these dependencies may need to be taken into account when containers may be restarted, for example, to correct an issue. When a container restart occurs, one or more dependent containers may also need to be restarted to ensure proper functionality.

Additionally, some containers may not start under load. For example, a request may not be made to a container as the container may be initializing. Furthermore, there may be some containers that should not be started. Such containers may include those that may not be ready to be used yet, and those that may not be ready to go to production yet. Unfortunately, a user may not easily manage containers, container dependencies, and actions that may be performed on containers. Therefore, there is a need in the art for a container management system that allows a server or a network administrator to manage container, container dependencies, and actions that may be performed on containers.

SUMMARY

A container management utility tool may deploy an object model that may persist all the container dependencies and relationships. Through a web front-end interface, for example, the containers may be started in a specific order or restarted, and the tool automatically determines the additional container that need to be started in order to maintain the integrity of the environment. Through the web interface, for example, the object model may be managed, and start-up orders or container dependencies may be updated. For containers that may not start under load, the object model may block access to the container until the container is fully initialized.

In an embodiment, computer-implemented method for managing containers comprises: receiving, by a computer, a request to perform an action associated with a first container hosted on a server; querying, by the computer, a machine-readable computer file comprising a dependency map associated with the first container, the dependency map indicating a set of one or more containers comprising at least one dependent resource that is dependent on at least one resource of the container, wherein the dependency map comprises a block list indicating to the computer each of the one or more containers in the set of one or more containers being prohibited from receiving a request to perform a second action from a user device based upon a dependent resource of each respective container; storing, by the computer, into an action queue the request to perform the second action for each of the one or more containers in the set of one or more containers prohibited from receiving the request according to the block list of the dependency map; issuing, by the computer, a command to perform the action to the one or more containers in the set in a sequential ordering based on a query of the dependency map associated with the first container, the sequential ordering determined according to a relationship of the dependent resource of the respective container with a resource of the first container; and in response to the first container performing the action: issuing, by the computer, the request to perform the second action stored in the action queue to each of the one or more containers in the block list of the dependency map.

In another embodiment, a system comprises a non-transitory storage medium configured to store one or more machine readable computer files comprising dependency maps of one or more containers; and a processor configured to receive a request to perform an action associated with a first container hosted on a server; query a machine-readable computer file comprising a dependency map associated with the first container, the dependency map indicating a set of one or more containers comprising at least one dependent resource that is dependent on at least one resource of the container, wherein the dependency map comprises a block list indicating to the computer each of the one or more containers in the set of one or more containers being prohibited from receiving a request to perform a second action from a user device based upon a dependent resource of each respective container; store into an action queue the request to perform the second action for each of the one or more containers in the set of one or more containers prohibited from receiving the request according to the block list of the dependency map; instruct a command to perform the action to the one or more containers in the set in a sequential ordering based on a query of the dependency map associated with the first container, the sequential ordering determined according to a relationship of the dependent resource of the respective container with a resource of the first container; and in response to the first container performing the action: instruct the request to perform the second action stored in the action queue to each of the one or more containers in the block list of the dependency map.

BRIEF DESCRIPTION OF THE DRAWINGS

The foregoing summary, as well as the following detailed description, is better understood when read in conjunction with the appended drawings. For the purpose of illustrating the claimed subject matter, there is shown in the drawings example constructions of various embodiments; however, the invention is not limited to the specific methods and instrumentalities disclosed.

DETAILED DESCRIPTION

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
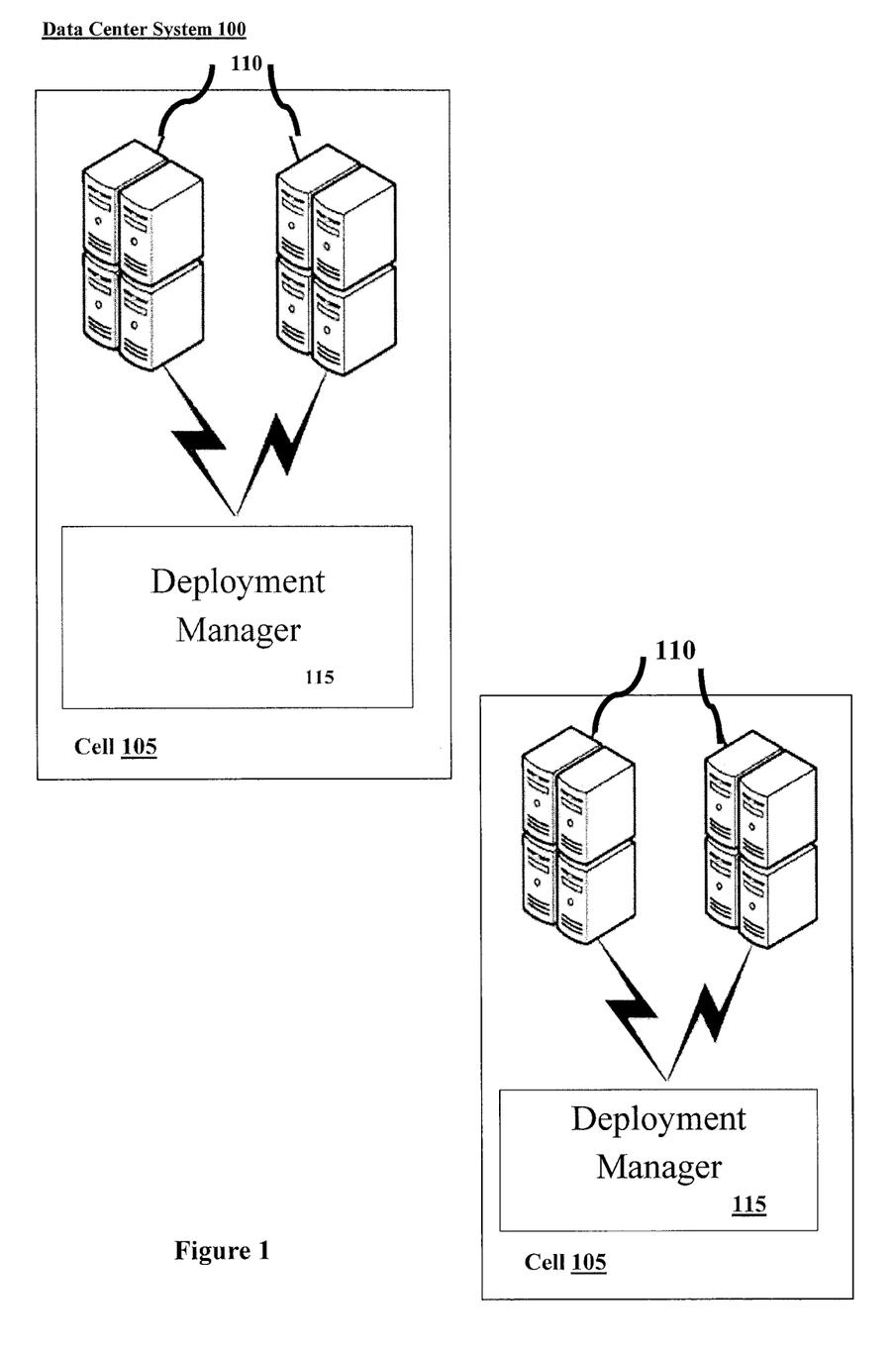
FIG. 1 depicts a block diagram of an example data center system in which aspects of the embodiments may be implemented.

FIG. 1 illustrates a block diagram of an example data center system 100 in implementing various aspects of the embodiments disclosed herein. Data center system 100 may be a facility that may be used for housing a large amount of electronic equipment such as computer equipment, communications equipment, or the like. Data center system 100 may be maintained by, for example, a vendor or an organization such as a financial institution or an insurance institution to execute the software applications that may handle the core business and operational data of the vendor or organization. For example, the vendor or organization may include a bank, a credit union, an insurance company, or the like such that the vendor or organization may have a data center system 100 where the vendor or organization may maintain, manage, and store data such as information corresponding to customer accounts and where transactions involving such data may be executed.

Data center system 100 may include one or more environmental controls such as, for example, air conditioning, fire suppression, raised flooring for air circulation, or the like. Data center system 100 may also include one or more redundant systems or components therein including, for example, one or more back-up power supplies, redundant data communications connections, or the like according to one embodiment. Additionally, data center system 100 may include one or more routers, switches, gateways, or the like to provide, for example, a communication infrastructure between various components such as, for example, servers, databases, computer terminals, mainframes, or the like within data center system 100 and one or more entities external to data center system 100. In an example embodiment, such routers, switches, or gateways may deploy network security elements including firewalls, Virtual Private Network (VPN) gateways, intrusion detection systems, or the like.

As shown in FIG. 1, in one embodiment, data center system 100 may include one or more servers 105. A server 105 may include any combination of hardware components such as processors, databases, storage drives, registers, cache, RAM memory chips, data buses, or the like and/or software components such as operating systems, database management applications, or the like. The servers 105 that may be implemented as separate structural and functional units of data center system 100 such that each of the servers 105, although part of data center system 100, may be at least partially self-contained and self-maintaining. For example, each of the servers 105 may store its own set of instructions to execute specific activities allocated thereto within data center system 100.

The servers 105 may include any combination of hardware components such as processors, databases, storage drives, registers, cache, RAM memory chips, data buses, or the like and/or software components such as operating systems, database management applications, or the like. According to one embodiment, the servers 105 may include a server computer on a computer network dedicated to running certain software applications that may manage, execute, and maintain the business logic and data of, for example, the vendor or organization of data center system 100.

As described further herein, a container is a copy of a self-contained execution environment comprising isolated CPU, memory, block I/O, and network resources that share the kernel of the host operating systems. The execution environment of a container may be isolated from its surroundings. Each server 105 may contain one or more containers such as, for example, a Linux Docker container. The containers may be dependent upon one another. For example, a first container may contain the data to be rendered by the application in a second container. In this situation, the application in the second container may not function properly if the first container fails. Furthermore, the server 105 may spawn additional containers if there is a heavier than normal web traffic and kill the additional containers when the traffic ebbs. Each container, once initiated, may register itself to a cluster load-balancing service. For example, when the container is a Linux Docker container, the Linux Docker container may register itself to the load balancing service of HAProxy. The cluster load balancing service may store the IP address of a cluster of containers, for example, a pod of containers in Kubernetes, and port address of each container in the cluster of containers.

According to one embodiment, a server 105 may be selected by a user, for example. After selecting the server 105, one or more containers may also be selected by a user. One or more actions such as do not start, start, and/or stop may then be associated with each selected containers within the server 105. For example, the user may choose from several actions that may be processed against the selected containers including, but not limited to, "Start," "Stop," and "Terminate." The "Start" action may start a container that is currently not running. The "Stop" action may allow the container to complete any in-flight transactions and gracefully close connections and then shut itself down. The "Terminate" action may halt the container process and may be used if a container process or thread may be hung and does not respond to normal stop procedures or "Stop" actions and/or if the container process or thread may be causing an error condition. Additionally, container dependencies and weights may be set for the selected containers, which will be described in more detail below.

Figure 2:
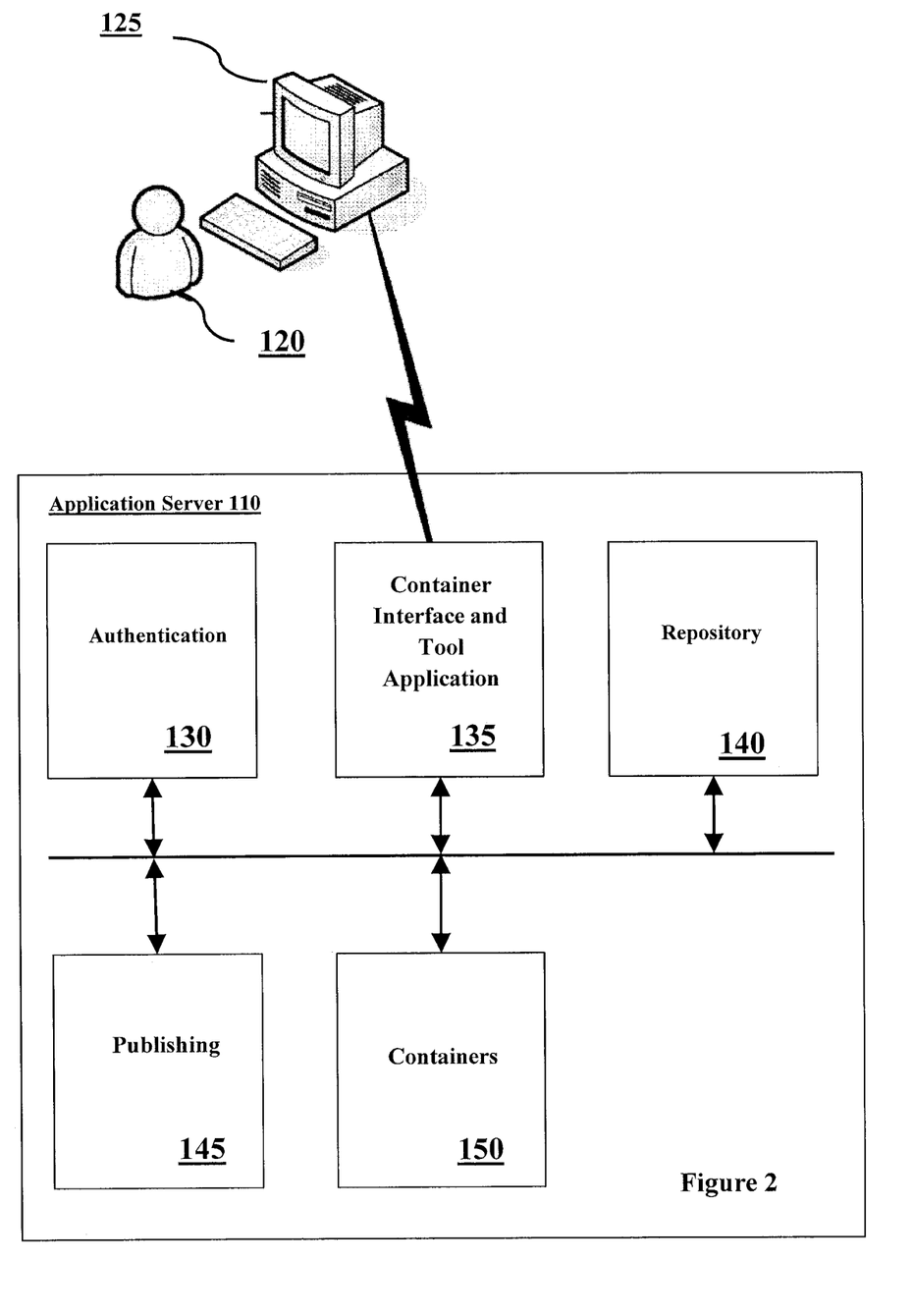
FIG. 2 depicts an example embodiment of a server in communication with a user via an electronic device.

FIG. 2 depicts an example embodiment of a server 105 in communication with a user 120 via an electronic device 125. User 120 may include a network administrator or the like, of data center system 100 that may configure the server 105 according to one embodiment.

User 120 may communicate with the server 105 using, for example, electronic device 125. Electronic device 125 may include hardware components such as a processor, a graphics card, a storage component, a memory component, a memory card reader, an antenna, a communication port, a disc drive, or the like. Electronic device 125 may also include software components such as an operating system that may control the hardware components. Electronic device 125 may include any other suitable components such that user 120 may create, manage, and execute containers on the server 105, as described in more detail herein. According to example embodiments, electronic device 125 may be a computer, a PDA, a server, or the like.

The electronic device 125 may be in operative communication with the server 105 via a network such as a Virtual Private Network (VPN), a Local Area Network (LAN), a Wide Area Network (WAN), the Internet, or the like such that user 120 may access the server 105. The server 105 may include any combination of systems and sub-systems. According to one embodiment, the server 105 may include authentication module 130, container interface and tool application 135, repository module 140, publishing module 145, and one or more containers 150. Authentication module 130, container interface and tool application 135, repository module 140, publishing module 145, and the containers 150 may be in operative communication with each other via, for example a bus or any other subsystem that may transfer data between computer components such as the modules in the server 105.

Container interface and tool application 135 of a server 105 may provide communication between electronic device 125 and various components and features of the server 105, for example. Container interface and tool application 135 may include software components such as operating systems, web-based management applications, or the like such that container interface and tool application 135 may provide the overall infrastructure and may be the primary consumer of information to manage containers that may be in the server 105, for example. Container interface and tool application 135 may also serve to interact and interface with the other functional components of the server 105 including authentication module 130, publishing module 145, repository module 140, and the containers 150.

According to one embodiment, container interface and tool application 135 may present an interface of a container management utility tool to user 120 via electronic device 125. The container management utility tool may deploy an object model that may provide interaction to modify and/or maintain containers 150 including dependencies and relationships between the containers 150. Through a web front-end interface, for example, the user 120 may indicate a specific order of starting the containers 150, or specify the number and template for additional containers 150 to be spawned to maintain the integrity of the environment. Additionally, through the web interface, for example, the user 120 may manage the object model, and update start-up orders or container dependencies. Thus, container interface and tool application 135 may receive input or modifications regarding container dependencies and relationships from the user 120 via an interface such as a webpage according to an example embodiment. In an embodiment, one or more container dependencies, relationships, or a collection of containers 150 may represent a system function such as "transfer funds." This allows for the user 120 to shutdown a specific function such as "transfer funds," without affecting other portions of the system. Such isolation of system functions using the collection of containers 150 may allow the operation of the system be secure and modular because each system function can be individually initiated, modified, and/or terminated. The user 120 may use the web front-end interface to manage an object model associated with a system function and may update start-up orders, container dependencies, and/or collection maps that represent the system function.

In one embodiment, the data center system 100 may implement container interface and tool application 135 such that the container interface and tool application 135 may communicate with each of the servers 105a, 105b, 105c, 105d. The container interface and tool application 135 may provide a single, customizable tool for container management and administration. Additionally, container interface and tool application 135 may allow a user or network administrator to manage the servers 105a, 105b, 105c, 105d. Container interface and tool application 135 may be configured to automatically query a server 105 that may be selected for a container 150. Container interface and tool application 135 may persist the object model in an Extensible Markup Language (XML) format such that modifications may be easily administered manually upon export.

In one embodiment, a repository module may store the information that may be entered by user 120 into the electronic device 125 to configure and manage the containers. Alternatively, one or more databases within data center system 100 may store such information such that the information may be shared among multiple servers 105a, 105b, 105c, 105d to control and manage containers 150 therein.

Authentication module 130 may include any combination of hardware components such as processors, databases, storage drives, registers, cache, RAM memory chips, data buses, or the like and/or software components such that authentication module 130 may provide a mechanism for authentication of user 120 before any modification or management of containers 150 may be made by user 120. Typically, the authentication module 130 may authenticate user such as user 120 upon the user providing credentials such as an account number, username, Personal Identification Number (PIN), password, or the like. Once authenticated, the authentication module 130 may grant a user to access and modify, for example, a server 105 and one or more containers 150.

Additionally, once the authentication module 130 authenticates a user 125, a server 105 may cache the authentication status to prevent unnecessary external authentication requests, for example. In some embodiments, the authentication module 130 may perform the authentication itself. In other embodiments, the authentication module 130 may delegate authentication authority to an authentication mechanism such as a web-based authentication service. In one embodiment, authentication module 130 may include bridges to various possible points of authentication such as the host application, the user's enterprise domain, or local cache of the server 105. In some embodiments, the authentication module 130 may manage, in cooperation with container interface and tool application 135, the passing of session-specific tokens, or other artifacts, to identify the context under which a user such as user 120 may interact with the server 105.

A server 105 may also include publishing module 145. Publishing module 145 may include any combination of hardware components such as processors, databases, storage drives, registers, cache, RAM memory chips, data buses, or the like and/or software components. User 120 and/or processes internal to the server 105 may use publishing module 145 to manipulate, display, or manage data such as container information including, but not limited to, do not start list, weights, load lists, container dependencies, container relationships, or the like. The server 105 may deliver data for containers 150 in a variety of ways including, but not limited to, Hypertext Transfer Protocol (HTTP) and/or Secure Hypertext Transfer Protocol (HTTP/S) for simple web-based access, Simple Main Transfer Protocol (SMTP), Web Services/Simple Object Access Protocol (SOAP), and Sharepoint for online review and collaboration of data. For example, according to one embodiment, publishing module 145 may generate interfaces such as webpages that may be displayed to user 120 via HTTP to manage containers 150.

A server 105 may also include repository module 140. In some embodiments, repository module 140 may provide persistent storage for the server 105. Repository module 140 may include, for example, a database, memory chips, hard drives, or any other suitable hardware components designed to store data. Repository module 140 may store applications and/or data provided to user 120 by the vendor via the server 110. For example, repository module 140 may store information corresponding to containers 150 such as container dependencies, container relationships, or the like.

In some embodiments, a server 105 may include containers 150. Containers 150 may provide a holistic runtime or execution environment to one or more applications. In other words, containers 150 may provide—within an operating system—dedicated resources for example CPU time or a portion of the memory, and a clean copy of a self-contained operating system to run one or more applications. Containers 150 may therefore be independent of each other: if a first container 150 crashes or has any other problems, a second container 150 may continue functioning normally. Because, separate portions of input/output (IO), memory, and CPU are assigned to each container 150, the applications within separate containers 150 may not collide with each other. Furthermore, as the operating system is abstracted away from containers 150, containers 150 may be moved across any Linux servers that supports any container runtime environment. The server 105 may contain as many containers 150 limited by hardware resource availability.

A container 150 may include a template of an application, for example a web server, which is running on the container 150. If an additional container 150 with the same application is needed, the user 120 may issue a command through the container interface tool and application 135 to generate a new container with the same template. After these operations, there will be an additional instance of the web server. Furthermore, the process of generating a new container 150 is significantly faster than the process of generating a new virtual machine. Furthermore, virtual machines are not stateless and require session data for initializing, whereas containers being stateless may be started without any session data. Also, as the containers 150 are separate and apart from each other, it is easy for a system administrator to isolate fault zones and stop the containers 150 in the fault zones. For example, a single container 150 may run multiple applications, and if the container 150 fails, the system administrator may start similar containers 150 based on required capacity. The system administrators may then repair and restart the single container 150. Alternatively, multiple duplicate containers 150 running the same set of applications may reside on different physical hosts and if a single physical host fails, then the containers 150 in the failed physical hosts may go offline. However, the system administrator can generate more duplicate containers 150 in the functioning physical hosts to maintain the integrity of the technical environment. Although the aforementioned description discloses a container having one application, one having ordinary skill in the art appreciates that there may be multiple applications running on a single container, and the container template may include the required settings for each of the multiple applications.

The containers 150 may be dependent upon one another. For example, a first container 150 may include a data to be rendered, and the second container 150 may include a rendering application. The second container 150 therefore may have to receive data from the first container 150 for the data to be rendered by an application running on the second container. In other words, the functionality of the second container 150 may be dependent upon whether or not the first container 150 is operational.

When a container comes online, the container may register itself to a cluster load balancing service. For the registration, the container may provide the IP address of a cluster of containers that the container is in and the port number of the container to the cluster load balancing service. In this way, the cluster load balancing service such as HAProxy in the context of the Docker containers may locate an individual container.

As the containers 150 are stateless, a server 105 or the user 120 can seamlessly integrate a patch or an update to the software running on the applications server. For example, if a first application running on a first container 150 has to be patched, the server 105 may generate a series of new containers 150 containing the patched version of the application, wherein the number of new containers 150 may be dependent upon the required capacity. The server 105 may then close the containers 150 with the unpatched version of the first application. A person having ordinary skill in the art understands that during this process, none of the services provided by the first application is interrupted.

As the containers 150 are generated based upon a template, it is computationally easy to replicate the containers 150. For example a container template may already have all the configurations such as the desired level of security, back end services configurations; and when the applications server generates a new container 150, the new container 150 may automatically include the configurations of the template. The user 120 or the server 105 therefore may not have to manually configure a newly started container 150.

Figure 3:
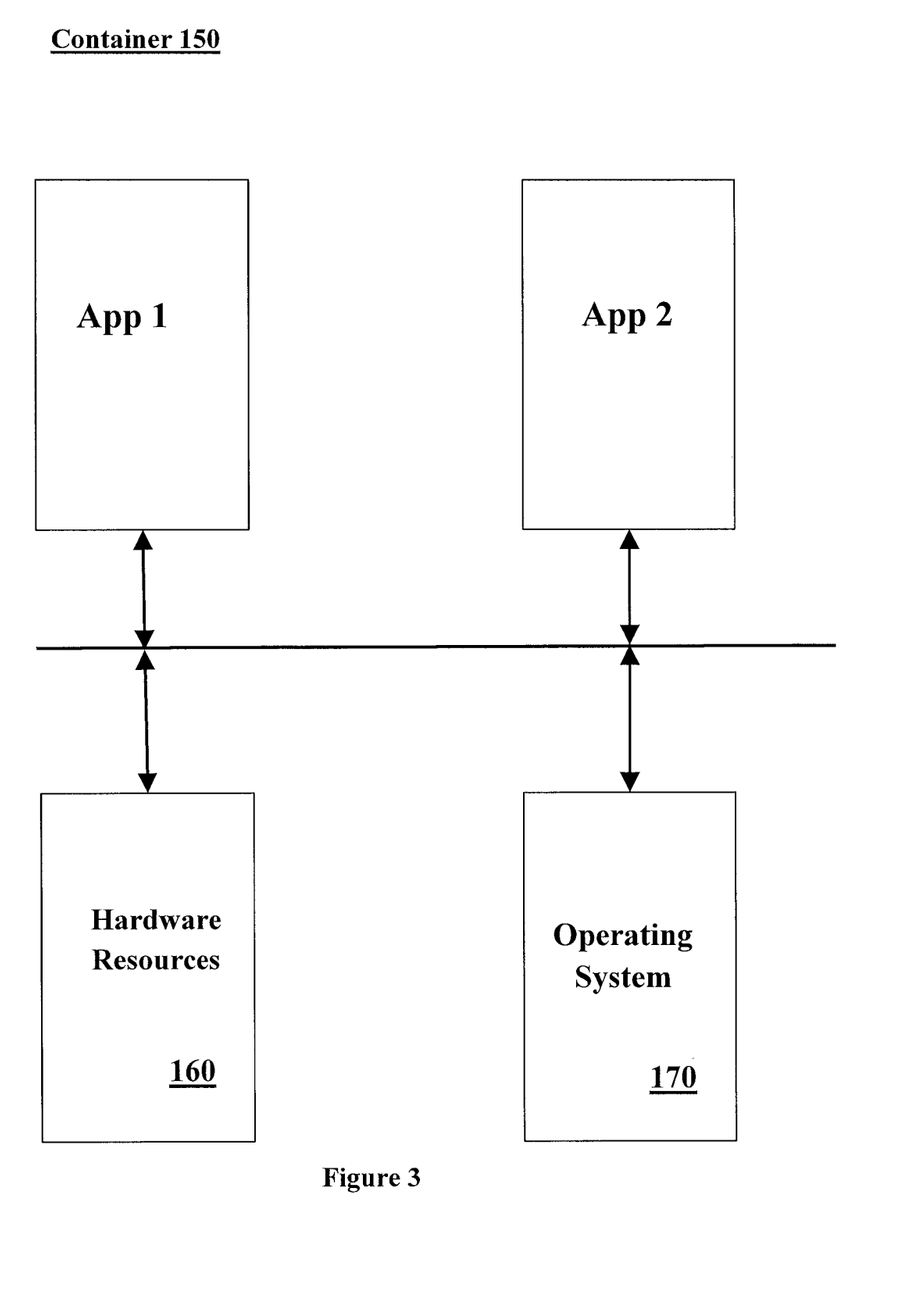
FIG. 3 depicts an example embodiment of a container.

FIG. 3 depicts an example embodiment of at least one container 150. According to one embodiment, container 150 may be, for example, a Linux Container (LXC) or a Docker Container. As described above, the container 150 may include a clean copy of the operating system 170 of the host device. Furthermore, the container 150 may include hardware resources 160, which may be a portion of the hardware resources such as CPU, memory, IO of the host device which has been dedicated to the container 150. Multiple applications, such as App 1 and App 2 may run on the container, as described above.

Figure 4:
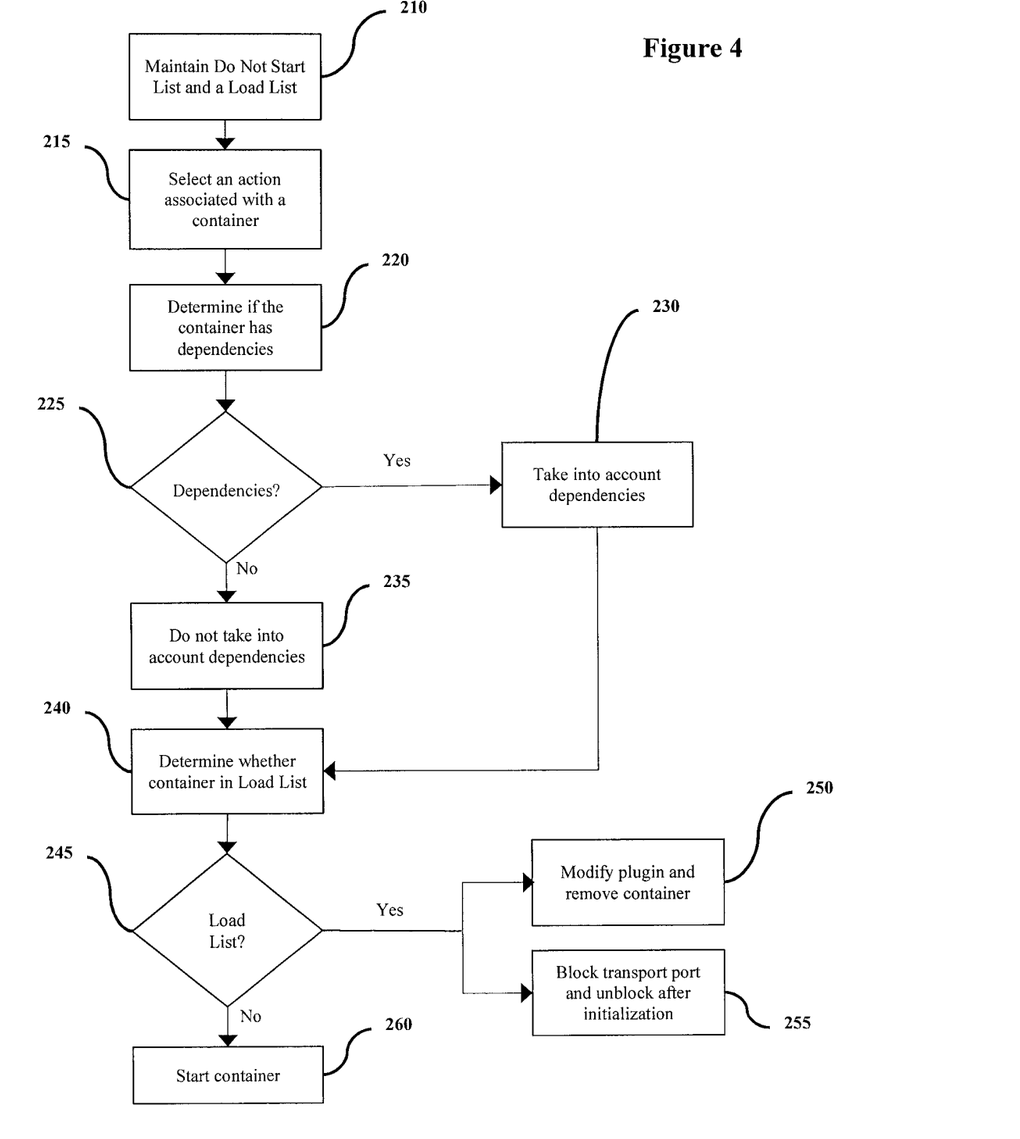
FIG. 4 depicts a flow diagram of an example method of container management according to one embodiment.
Figure 6:
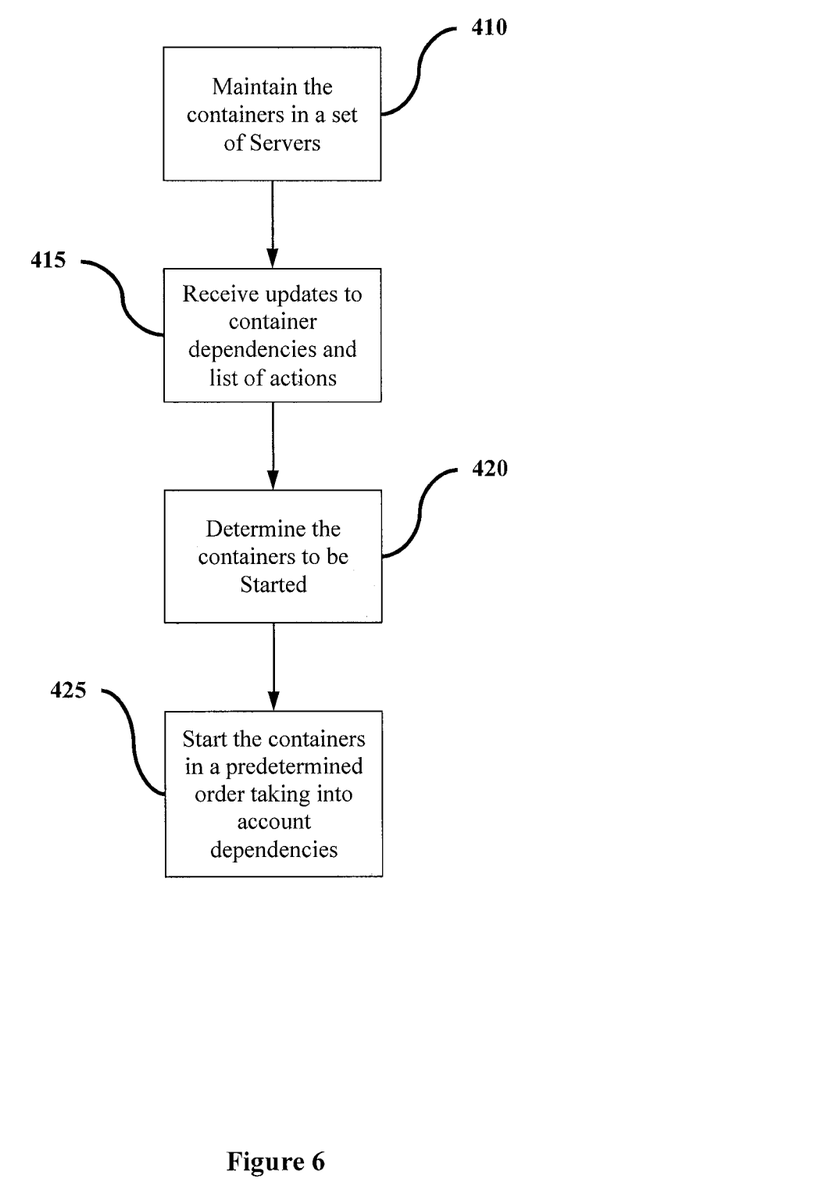
FIG. 6 depicts a flow diagram of an example method of starting a container according to one embodiment.

FIG. 4 depicts a flow diagram of an exemplary method of container management. As shown in FIG. 6, at 210, a data center system, such as data center system 100 described with respect to FIG. 1, may maintain a do not start list and a load list of each container. For example, a data center may include servers 105. Each server 105 may contain one or more containers. The containers may provide a holistic runtime environment to one or more applications.

Any component of the data center system including each server 105, for example, may maintain a list of containers that may not be started or a list of containers to be started. For example, each server 105 may maintain a do not start list that may include one or more containers that may not be started according to one embodiment. Additionally, each server 105 may maintain a load list that may include one or more containers that may be prevented from starting under load such that a request may not be made to the container as the container may be initializing. In one embodiment, a user 120 may manage and maintain the do not start list and load list may through the electronic device 125.

At step 215, an action associated with a container may be selected. For example, a user or network administrator may provide a selection of an action to be performed by one or more containers. Alternatively, components of the data center system may automatically select an action based on, for example, a queue of actions stored in a storage component. Thus, a queue may be provided that stores the actions that may be automatically provided to, for example, the containers of a server 105 in the data center system. According to one embodiment, the actions may include starting, initiating, stopping, terminating, or the like.

At step 220, the data center system may determine whether the container has any dependencies. In one embodiment, a container may have additional containers dependent therefrom. For example, a first container may have one or more containers such as a second container, a third container, or the like that may depend thereon such that when the first container malfunctions or stops performing, the second container and the third container may also malfunction or stop performing.

At step 225, if the container has a dependency, at 230, the dependency may be taken into account when the action may be performed by the container. Thus, if a user selects one or more actions, at 215, when the container may be performing those actions, the dependency of other containers determined, at 220, may be taken into account. For example, when an action may be selected for a particular container, a dependency map, such as a database, or local XML file that includes the container dependencies, may be checked to determine if any other containers may be dependent on the service that the particular container may be currently providing. If such dependencies exist based on the aforementioned check of the dependency map, the dependent container may automatically be added to the action list. Thus, if container "X" provides a service to container "Y" & container "Z" and user may want to "Stop" container X, the system will auto select the stop action for "Y" & "Z" also. If a user wants to start container "Y" the system may check the dependency map and may automatically select to "Start" container "X" as well. During these actions, the system may also make sure that container "X" is fully functioning before starting container "Y."

At step 225, if the container does not have a dependency, at 235, the container does not take dependency into account when the container performs the action. Thus, if a user selects one or more actions, at step 215, the container may perform the action regardless of the other containers present because no dependency may currently exist.

The system may further determine, at step 240, whether the container may be in a load list. For example, the data center system may include a load list that may be stored in one or more components such as a server. The load list may include a list of the containers that may be prevented from starting under load. In one embodiment, the load list may include a list of the containers to which a request may not be made to the container as the container may be starting.

At step 245, if the container is in the load list, at step 250, a dependency file may be modified and the container may be removed. For example, a container may not be initialized if the container is under load or in the load list. Thus, in one embodiment, the container may not receive requests during initialization or loading to prevent the container from initializing incorrectly or from throwing an error to the calling process. When a start or a restart action may be invoked on a container in the load list, the dependency file may be modified to ensure that the container does not receive any requests. The dependency file may be a file such as an XML based file that includes the identity and location of all containers within a particular server that may handle requests from a user. Alternatively, at step 255, the transport port may be blocked. After initialization of the container, the transport port may then be unblocked. For example, a container may utilize a unique transport port, in order to process requests. Such a transport port may be blocked at the Operating System level to simulate that the container may no longer be accessible on the network. A cluster load balancer plugin may monitor the transport ports to determine a container's network availability. If the cluster load balancer may not reach the transport port after certain number of attempts, the cluster load balancer may no longer route request to that particular container. After the container has been restarted and is fully initialized, the transport port at the Operating System level may be unblocked and the cluster load balancer may then enable the container to start receiving network traffic.

At step 245, if the container is not in the load list, at 260, the container may be started and the action may be performed on the container. As described above, dependencies may be taken into account when performing the action including starting and restarting the container, or like.

Figure 5:
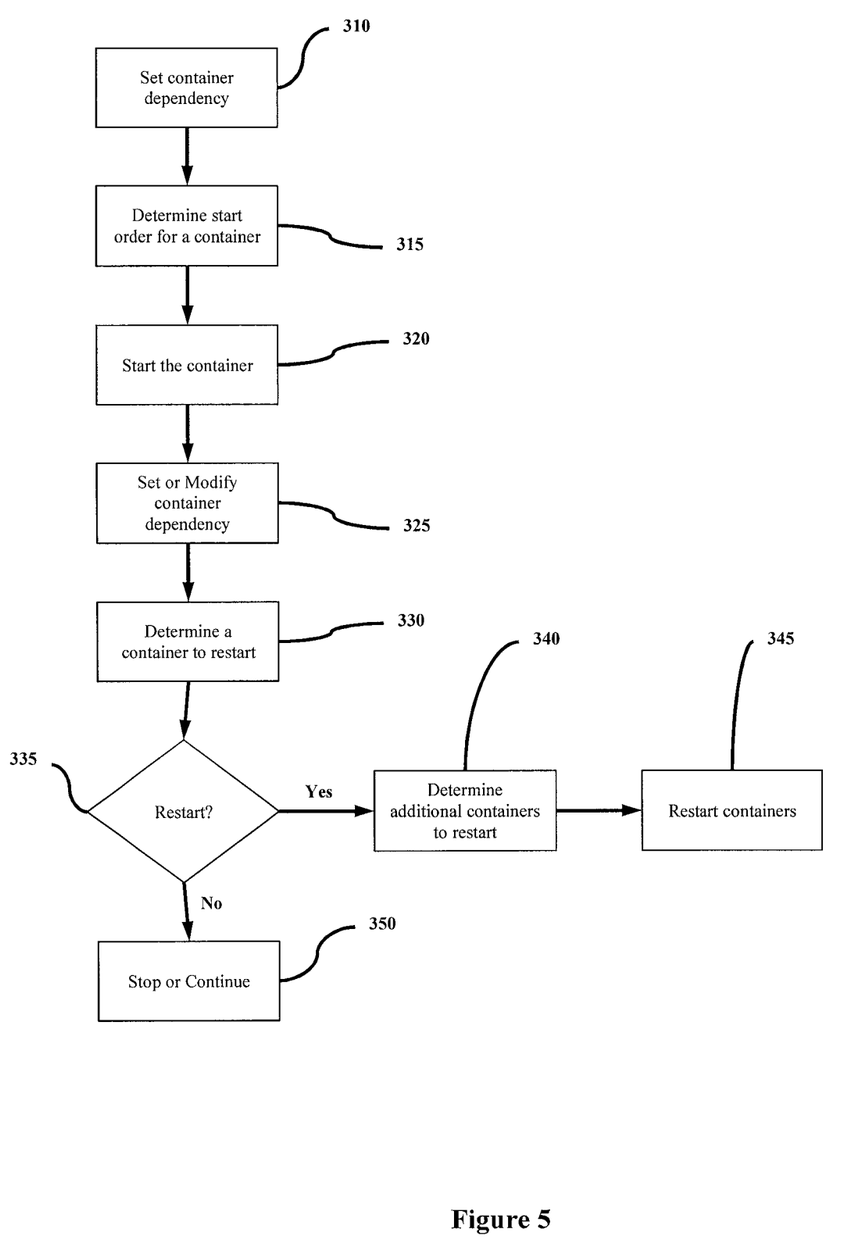
FIG. 5 depicts a flow diagram of an example method of managing a container according to one embodiment.

FIG. 5 depicts a flow diagram of another example method of managing containers, according to an exemplary embodiment. As shown in FIG. 5, at step 310, a user or a network administrator may set one or more dependencies of one or more containers in a server of a data center system. Such dependencies may be set using, for example, container interface and tool application 135, via an interface of the electronic device 125.

At 315, the components of data center systems such as a server may determine a start order for one or more containers. In one embodiment, the start order may be a function of the container dependencies that may be set at 310. For example, a first container may need to be started before a second container that is dependent upon the first container. Additionally, the start order may be a function of a weight associated with the container. For example, each of the containers may have a weight value corresponding thereto. In one embodiment, the containers with a lower weight value may be higher, or given greater priority, in the start order than a container with a lower weight value. Thus, a first container with a weight value of 10, for example, may be first in a start order with a second container that may have a weight value of 20 being second in the start order and a third container that may have a weight value of 30 being third in the start-up order. Additionally, containers with equal weight values may be started in parallel. According to one embodiment, a container's numeric weight may be determined by an overall container dependency tree. The container dependency tree may allow a more granule control mechanism to provide full server container initialization. If a container relies on other container services, the container may not start until all dependent containers may be fully initialized. As described above, the containers with the lowest numeric weight must be started first. All containers that are not dependent on any other containers may receive a weight value such as "99" such that the containers may be started, stopped, or restarted without regard to any other containers.

After determining the start order at step 315, the container may be started at step 320. For example, the container may run an application for the data center system. In one embodiment, the container may provide a holistic runtime environment to one or more applications. In other word, the container may provide—within an operating system—dedicated resources for example CPU time or a portion of the memory, and a clean copy of a self-contained operating system to run one or more applications.

At step 325, the user or a network administrator may set or modify the container dependencies even after the container may have been started at step 320. For example, the user may log into the server at which point the user may change one or more dependencies through an interface of a container management utility tool.

At step 330, the user or one or more components of the data center system may determine whether to restart one or more containers. For example, the user may want to restart one or more containers after setting or modifying the dependencies at step 325. The user may do so by selecting a restart action that may be used to determine the one or more containers to restart. Additionally, the components of the data center system may store one or more criteria to automatically restart the containers if, for example, maintenance may have been done on the various components of the data center system.

At step 335, if one or more containers may be restarted, at step 340, the server may determine whether additional containers may be restarted within the server based on the dependencies. For example, if a first container has a second container dependent thereon, the second container may also need to be restarted if, based on the determination at step 330; first container may need to be restarted. Then, at step 345, the additional containers may be restarted, based on the determination at 340.

At step 335, if one or more containers are not to be restarted, at step 350, the container may be stopped or may continue running. For example, a user may set or modify the container dependencies at 320. However, there may be no determination that the container may need to be restarted, at step 330. Therefore, at step 350, a container may continue to run or may be stopped, by the user, for example. Additionally, at step 350, a determination may be made on whether one or more containers may not start under load such that access to the container may be stopped until the container fully initialized.

FIG. 6 is a flow diagram of an example method of starting a container, according to an exemplary embodiment. As shown in FIG. 6, at 410, a data center system such as data center system may maintain one or more servers 105a, 105b, 105c, 105d. In one embodiment, each of the servers 105a, 105b, 105c, 105d may include one or more containers such as containers 150.

At step 415, the data center system components such as a server may receive updates to containers dependencies and a list of actions that may be performed by the containers. For example, a user or a network administrator may modify or update one or more dependencies of one or more containers via an interface in the electronic device 125. The server may receive and store these updated dependencies such that the dependencies may be taken into account when an action may be performed on the container. The user may also add one or more actions including, but not limited to, do not start, start, stop, terminate, or the like to the list of actions that may be performed by the containers. Additional actions such as "Stop Application", "Start Application", "Stop Listener", "Start Listener", "Stop Queue", "Start Queue", and "Disable/Enable Resource" may be performed to take actions against objects within each container.

At step 420, the data center system components such as the server may determine the container that may be started. For example, the server may determine which, if any, container may be invoked by, for example, a user or by one or more components of the data center system. The data center system components such as the server may also check a predetermined list of actions associated with each container to determine the container that may be started. According to one embodiment, the list of actions may include start, do not start, do not start under load, and/or restart.

After determining the containers to be started, at step 420, the server may start the containers in a predetermined order taking into account the dependencies at step 425. For example, the components of data center systems such as the server, may determine a start order for one or more containers. In one embodiment, the start order may be a function of the container dependencies that may be mapped using dependency mapping. The dependency map may include a database or local XML file that may indicate the relationship that one container may have with another container. For example, the dependency map may include a dependency relationship identified by "cont_X:cont_A,cont_C." In one embodiment, such a dependency relationship may indicate that, if an action may be taken against "cont_X," the action may also affect "cont_A" and "cont_C" as well. Thus, if "cont_A" may be restarted, for example, "cont_A" & "cont_C" may also be restarted as well. For example, a first container may need to be started before a second container dependent upon the first container. In one embodiment, the dependencies of the containers may be based on predetermined weights associated with each container. For example, each of the containers may have a weight value associated therewith. The weight value may be used to determine the start order and/or dependencies. For example, a first container with a weight value of 40 may be started before a second container with a weight value of 20. Containers with equal weight values may be started in parallel.

Exemplary Computing and Networking Environments

Figure 7:
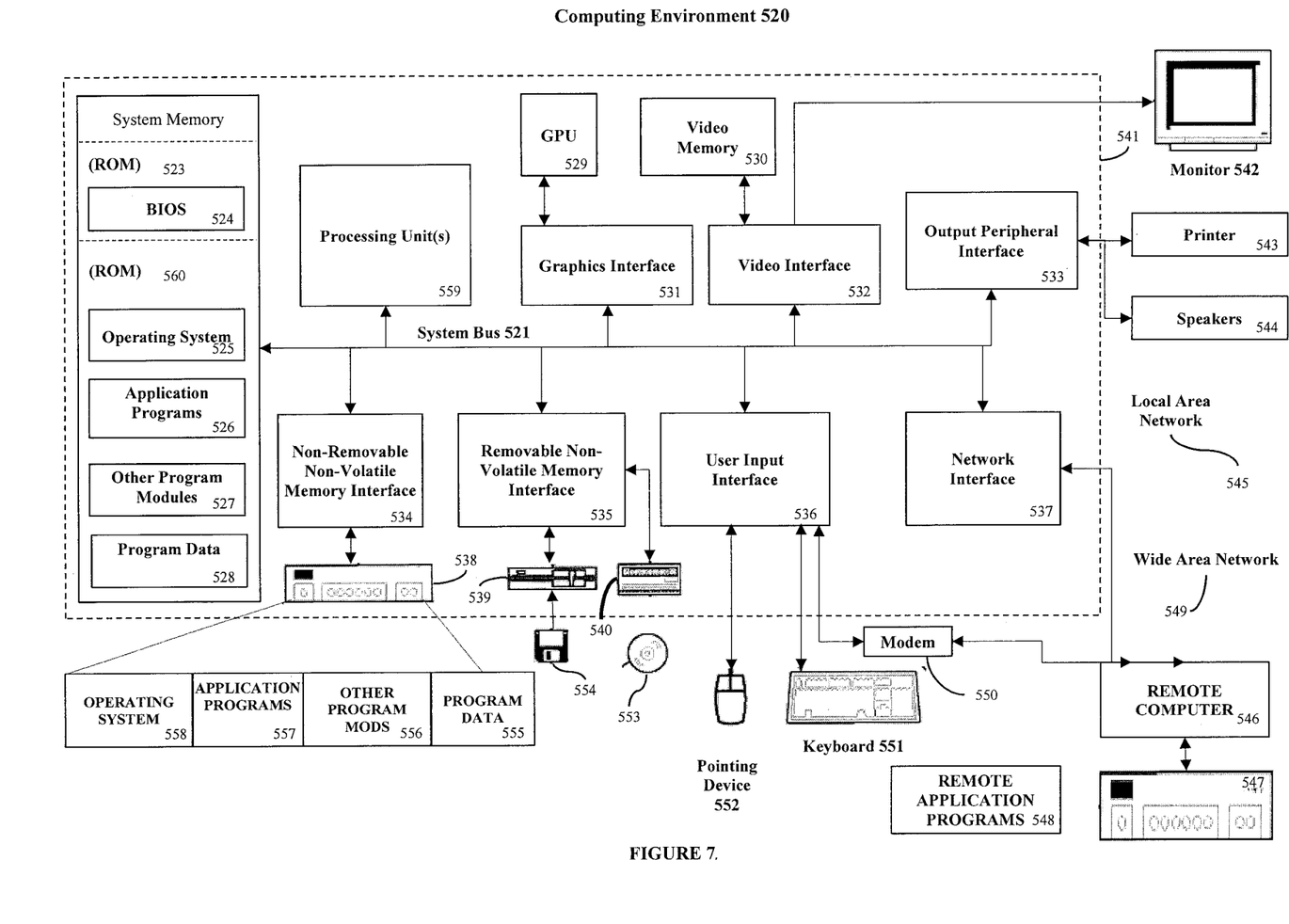
FIG. 7 illustrates a block diagram representing an exemplary computing device environment suitable for use in conjunction with aspects of the invention.

FIG. 7 shows a block diagram representing an exemplary computing device suitable for use in conjunction with implementing aspects of the invention. For example, the computer executable instructions that carry out the processes and methods described herein may reside and/or be executed in such a computing environment as shown in FIG. 7. The computing system environment 520 is only one example of a suitable computing environment and is not intended to suggest any limitation as to the scope of use or functionality of the presently disclosed subject matter. Neither should the computing environment 520 be interpreted as having any dependency or requirement relating to any one or combination of components illustrated in the exemplary operating environment 520.

Aspects of the presently disclosed subject matter are operational with numerous other general purpose or special purpose computing system environments or configurations. Examples of well-known computing systems, environments, and/or configurations that may be suitable for use with this subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 541. Components of computer 541 may include, but are not limited to, a processing unit 559, a system memory 522, and a system bus 521 that couples various system components including the system memory to the processing unit 559. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 541 typically includes a variety of computer readable media. Computer readable media can be any available media that can be accessed by computer 541 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 541. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 522 includes computer storage media in the form of volatile and/or nonvolatile memory such as read only memory (ROM) 523 and random access memory (RAM) 560. A basic input/output system 524 (BIOS), containing the basic routines that help to transfer information between elements within computer 541, such as during start-up, is typically stored in ROM 523. RAM 560 typically contains data and/or program modules that are immediately accessible to and/or presently being operated on by processing unit 559. By way of example, and not limitation, FIG. 7 illustrates operating system 525, application programs 526, other program modules 527, and program data 528.

The computer 541 may also include other removable/non-removable, volatile/nonvolatile computer storage media. By way of example only, FIG. 7 illustrates a hard disk drive 538 that reads from or writes to non-removable, nonvolatile magnetic media, a magnetic disk drive 539 that reads from or writes to a removable, nonvolatile magnetic disk 554, and an optical disk drive 540 that reads from or writes to a removable, nonvolatile optical disk 553 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 538 is typically connected to the system bus 521 through a non-removable memory interface such as interface 534, and magnetic disk drive 539 and optical disk drive 540 are typically connected to the system bus 521 by a removable memory interface, such as interface 535.

The drives and their associated computer storage media discussed above and illustrated in FIG. 7, provide storage of computer readable instructions, data structures, program modules and other data for the computer 541. In FIG. 7, for example, hard disk drive 538 is illustrated as storing operating system 558, application programs 557, other program modules 556, and program data 555. Note that these components can either be the same as or different from operating system 525, application programs 526, other program modules 527, and program data 528. Operating system 558, application programs 557, other program modules 556, and program data 555 are given different numbers here to illustrate that, at a minimum, they are different copies. A user may enter commands and information into the computer 541 through input devices such as a keyboard 551 and pointing device 552, commonly referred to as a mouse, trackball or touch pad. Other input devices (not shown) may include a microphone, joystick, game pad, satellite dish, scanner, or the like. These and other input devices are often connected to the processing unit 559 through a user input interface 536 that is coupled to the system bus, but may be connected by other interface and bus structures, such as a parallel port, game port or a universal serial bus (USB). A monitor 542 or other type of display device is also connected to the system bus 521 via an interface, such as a video interface 532. In addition to the monitor, computers may also include other peripheral output devices such as speakers 544 and printer 543, which may be connected through an output peripheral interface 533.

The computer 541 may operate in a networked environment using logical connections to one or more remote computers, such as a remote computer 546. The remote computer 546 may be a personal computer, a server, a router, a network PC, a peer device or other common network node, and typically includes many or all of the elements described above relative to the computer 541, although only a memory storage device 547 has been illustrated in FIG. 7. The logical connections depicted in FIG. 7 include a local area network (LAN) 545 and a wide area network (WAN) 549, but may also include other networks. Such networking environments are commonplace in offices, enterprise-wide computer networks, intranets and the Internet.

When used in a LAN networking environment, the computer 541 is connected to the LAN 545 through a network interface or adapter 537. When used in a WAN networking environment, the computer 541 typically includes a modem 550 or other means for establishing communications over the WAN 549, such as the Internet. The modem 550, which may be internal or external, may be connected to the system bus 521 via the user input interface 536, or other appropriate mechanism. In a networked environment, program modules depicted relative to the computer 541, or portions thereof, may be stored in the remote memory storage device. By way of example, and not limitation, FIG. 7 illustrates remote application programs 548 as residing on memory device 547. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and nonvolatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

Figure 8:
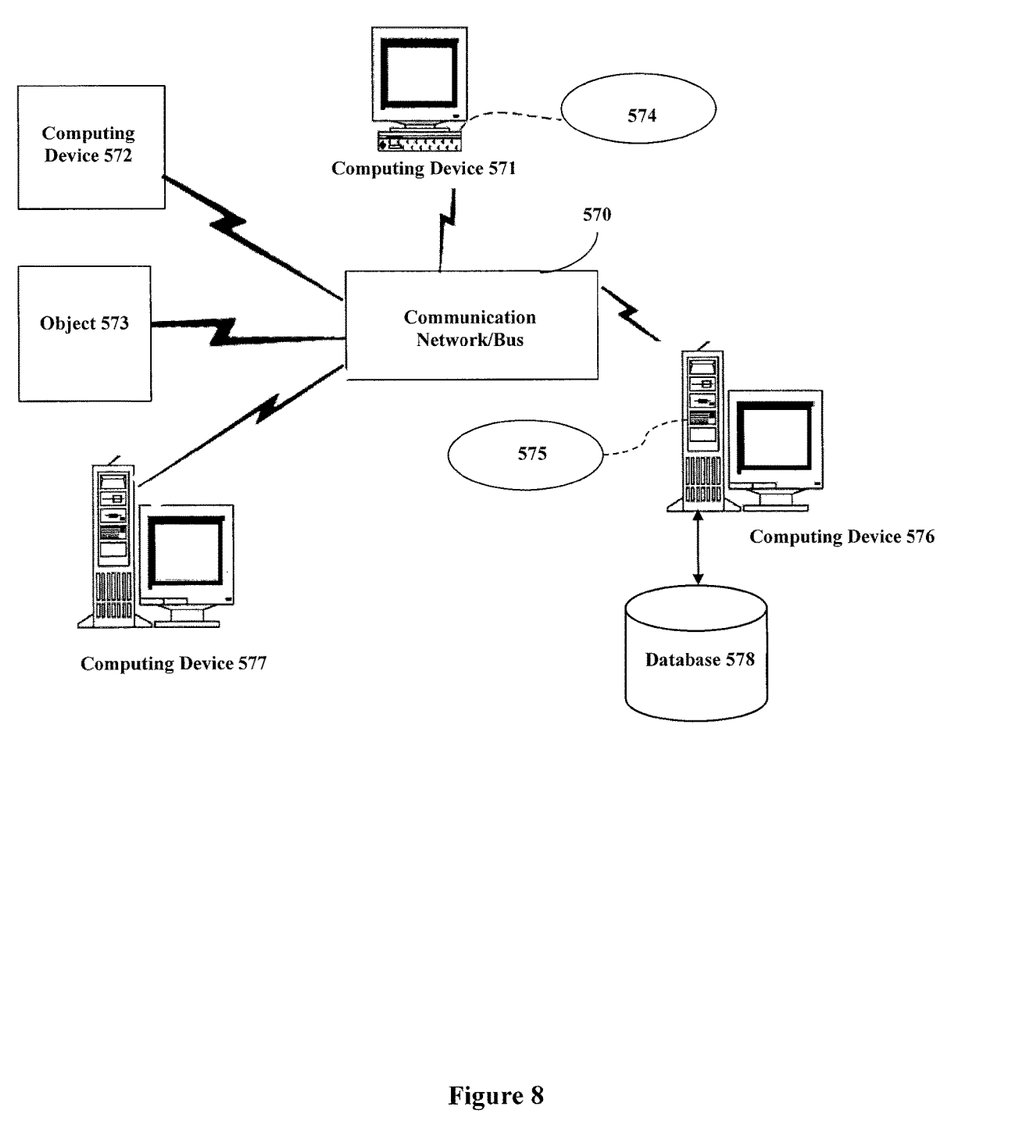
FIG. 8 illustrates an exemplary networked computing environment in which computerized processes may be implemented to perform aspects of the invention.

Referring next to FIG. 8, shown is an exemplary networked computing environment in which many computerized processes may be implemented to perform aspects of the invention. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 8 provides a schematic diagram of an exemplary networked or distributed computing environment. The environment comprises computing devices 571, 572, 576, and 577 as well as objects 573, 574, and 575, and database 578. Each of these entities 571, 572, 573, 574, 575, 576, 577 and 578 may comprise or make use of programs, methods, data stores, programmable logic, etc. The entities 571, 572, 573, 574, 575, 576, 577 and 578 may span portions of the same or different devices such as PDAs, audio/video devices, MP3 players, personal computers, etc. Each entity 571, 572, 573, 574, 575, 576, 577 and 578 can communicate with another entity 571, 572, 573, 574, 575, 576, 577 and 578 by way of the communications network 570. In this regard, any entity may be responsible for the maintenance and updating of a database 578 or other storage element.

This network 570 may itself comprise other computing entities that provide services to the system of FIG. 8, and may itself represent multiple interconnected networks. In accordance with an aspect of the presently disclosed subject matter, each entity 571, 572, 573, 574, 575, 576, 577 and 578 may contain discrete functional program modules that might make use of an API, or other object, software, firmware and/or hardware, to request services of one or more of the other entities 571, 572, 573, 574, 575, 576, 577 and 578.

It can also be appreciated that an object, such as 575, may be hosted on another computing device 576. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures that may also leverage cloud resources. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 10, any entity 571, 572, 573, 574, 575, 576, 577 and 578 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIGS. 7 and 8, the systems and methods provided herein cannot be construed as limited in any way to a particular computing architecture or operating system. Moreover, while the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise Random Access Memory (RAM), Read Only Memory (ROM), Electrically Erasable Programmable Read-Only Memory (EEPROM), CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product. Additionally, the operations of the methods and system disclosed herein may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for managing containers, the method comprising:

receiving, by a computer, a registration of a set of one or more containers to a cluster load balancing service, wherein the cluster load balancing service locates the set of one or more containers based on the registration, and wherein a group of the one or more containers are designated as corresponding to a specific system function;

in response to the registration, updating a dependency map associated with the set of one or more containers;

identifying, based on the dependency map, at least one additional container that needs to be started to maintain integrity of a computing environment executing the group of one or more containers;

providing a user interface for management of at least collections of containers;

receiving user input, provided via the user interface, specifying one or more additional containers for the system function;

in response to the user input, updating the group of the one or more containers designated as corresponding to the specific system function to include the one or more additional containers indicated in the user input;

receiving, by the computer, a request to perform a first action associated with the updated group of one or more containers;

querying, by the computer, a machine-readable computer file comprising the dependency map, wherein the dependency map comprises a block list indicating to the computer at least one container, of the one or more containers in the updated group of one or more containers, that are prohibited from performing a second action, wherein the prohibition to perform the second action is based upon a dependent resource of each respective container of the at least one container;

storing, by the computer and based on the querying, into an action queue a request to perform the second action;

determining that at least one container, from the group of one or more containers, is not fully initialized, and in response, blocking the first action until the group of containers are fully initialized; and in response to a first container, of the at least one container, performing part of the first action:

instructing, by the computer, the first container to perform part of the second action, wherein the performing the part of the second action is based on the action queue and the block list of the dependency map.

2. The method according to claim 1, further comprising:
identifying, by the computer, one or more dependent containers that depend on the first container according to the dependency map in response to the computer determining at least one container depends on the first container based on the query of the dependency map.

3. The method according to claim 1, further comprising:
identifying, by the computer, one or more dependencies of the first container according to the dependency map in response to the computer determining the first container depends from at least one container based on the query of the dependency map.

4. The method according to claim 1, further comprising:
receiving, by the computer, from a client computer a weight assigned to a container in the one or more containers to perform the first action, wherein a sequential ordering is further based on the weight assigned to the weighted container.

5. The method according to claim 1, further comprising:
automatically generating, by the computer, an action list comprising a queue of one or more actions to be issued to the one or more containers according to a sequential ordering.

6. The method according to claim 1, further comprising:
automatically generating, by the computer, a do not start list based upon the dependency map, wherein the do not start list is a machine-readable computer file comprising a list of containers blocked from execution by each respective server hosting each respective container.

7. The method according to claim 1, wherein a container information is selected from group consisting of: a container depending on the first container, a container from which the first container depends, a load list comprising the first container, and a do not start list comprising the first container.

8. The method according to claim 1, further comprising:
generating, by the computer, the dependency map of the first container based upon a container information for the first container.

9. The method according to claim 1, further comprising:
determining, by the computer, a status of the first container in response to receiving a request to perform an action associated with the first container.

10. The method according to claim 1, wherein the set of one or more containers is associated with a system function.

11. A system comprising:
a non-transitory storage medium configured to store one or more machine readable computer files comprising dependency maps of one or more containers; and
a processor configured to:
receive a registration of a set of one or more containers to a cluster load balancing service, wherein the cluster load balancing service locates the set of one or more containers based on the registration, and wherein a group of the one or more containers are designated as corresponding to a specific system function;

in response to the registration, update a dependency map associated with the set of one or more containers;

identify, based on the dependency map, at least one additional container that needs to be started to maintain integrity of a computing environment executing the group of one or more containers;

provide a user interface for management of at least collections of containers;

receive user input, provided via the user interface specifying one or more additional containers for the system function;

in response to the user input, update the group of the one or more containers designated as corresponding to the specific system function to include the one or more additional containers indicated in the user input;

receive a request to perform a first action associated with the updated group of one or more containers;

query a machine-readable computer file comprising the dependency map, wherein the dependency map comprises a block list indicating to the computer at least one container, of the one or more containers in the updated group of one or more containers, that are prohibited from performing a second action, wherein the prohibition to perform the second action is based upon a dependent resource of each respective container of the at least one container;

store into an action queue a request to perform the second action;

determine that at least one container, from the group of one or more containers, is not fully initialized, and in response, blocking the first action until the group of containers are fully initialized; and in response to a first container, of the at least one container, performing part of the first action:

instruct the first container to perform part of the second action, wherein the performing the part of the second action is based on the action queue and the block list of the dependency map.

12. The system according to claim 11, wherein the processor is further configured to:
identify one or more dependent containers that depend on the first container according to the dependency map in response to the computer determining at least one container depends on the first container based on the query of the dependency map.

13. The system according to claim 11, wherein the computer is further configured to:
identify one or more dependencies of the first container according to the dependency map in response to the processor determining the first container depends from at least one container based on the query of the dependency map.

14. The system according to claim 11, wherein the processor is further configured to:
receive from a client computer a weight assigned to a container in the one or more containers to perform the first action, wherein a sequential ordering is further based on the weight assigned to the weighted container.

15. The system according to claim 11, wherein the processor is further configured to:
automatically generate an action list comprising a queue of one or more actions to be issued to the one or more containers according to a sequential ordering.

16. The system according to claim 11, wherein the processor is further configured to:
automatically generate a do not start list based upon the dependency map, wherein the do not start list is a machine-readable computer file comprising a list of containers blocked from execution by each respective server hosting each respective container.

17. The system according to claim 11, wherein a container information is selected from group consisting of: a container depending on the first container, a container from which the first container depends, a load list comprising the first container, and a do not start list comprising the first container.

18. The system according to claim 11, wherein the processor is further configured to:
generate the dependency map of the first container based upon a container information for the first container.

19. The system according to claim 11, wherein the processor is further configured to:
determine a status of the first container in response to receiving a request to perform an action associated with the first container.

20. A non-transitory computer-readable storage medium storing instructions that, when executed by a computing system, cause the computing system to perform a process for managing containers, the process comprising:
receiving, by a computer, a registration of a set of one or more containers to a cluster load balancing service, wherein the cluster load balancing service locates the set of one or more containers based on the registration and wherein a group of the one or more containers are designated as corresponding to a specific system function;
in response to the registration, updating a dependency map associated with the set of one or more containers;
identifying, based on the dependency map, at least one additional container that needs to be started to maintain integrity of a computing environment executing the group of one or more containers;
providing a user interface for management of at least collections of containers;
receiving user input, provided via the user interface, specifying one or more additional containers for the system function;
in response to the user input, updating the group of the one or more containers designated as corresponding to the specific system function to include the one or more additional containers indicated in the user input;
receiving, by the computer, a request to perform a first action associated with the update group of one or more containers;
querying, by the computer, a machine-readable computer file comprising the dependency map, wherein the dependency map comprises a block list indicating to the computer at least one container, of the one or more containers in the updated group of one or more containers, that are prohibited from performing perform a second action, wherein the prohibition to perform the second action is based upon a dependent resource of each respective container of the at least one container;
storing, by the computer and based on the querying, into an action queue a request to perform the second action; and
in response to a first container, of the at least one container, performing part of the first action:
instructing, by the computer, the first container to perform part of the second action, wherein the performing the part of the second action is based on the action queue and the block list of the dependency map.

* * * * *